(12) United States Patent
Wolfgang

(10) Patent No.: US 6,191,682 B1
(45) Date of Patent: Feb. 20, 2001

(54) KEYLESS ENTRY SYSTEM AND SENSOR THEREFOR

(76) Inventor: Carl L. Wolfgang, 6710 Ellenton Gillette Rd., #357, Palmetto, FL (US) 34221

( * ) Notice: Under 35 U.S.C. 154(b), the term of this patent shall be extended for 0 days.

(21) Appl. No.: 09/035,272

(22) Filed: Mar. 9, 1998

Related U.S. Application Data

(63) Continuation-in-part of application No. 08/666,818, filed on Jun. 19, 1996.

(51) Int. Cl.$^7$ ............................................. G06F 7/04
(52) U.S. Cl. .................................. 340/5.2; 200/61.45 R; 340/5.51
(58) Field of Search ....................... 310/311; 340/825.31, 340/5.2, 5.51; 200/181, 61.45 R, 61.62

(56) References Cited

U.S. PATENT DOCUMENTS

| | | | |
|---|---|---|---|
| 4,197,524 | 4/1980 | Salem | 340/147 |
| 4,205,325 | 5/1980 | Haygood et al. | 340/147 MD |
| 4,383,242 | 5/1983 | Sassover et al. | 340/64 |
| 4,868,915 | 9/1989 | Anderson | 340/825.31 |
| 4,885,572 | 12/1989 | Iwata et al. | 340/425.5 |
| 4,912,460 | 3/1990 | Chu | 340/825.3 |
| 4,973,958 | 11/1990 | Hirano et al. | 340/825.69 |
| 5,134,392 | 7/1992 | Takeuchi | 340/825.69 |

*Primary Examiner*—Michael Horabik
*Assistant Examiner*—M. Shimizu
(74) *Attorney, Agent, or Firm*—Charles J. Prescott

(57) ABSTRACT

A keyless entry system and sensor for unlocking the door locks of a vehicle. The sensor, preferably in the form of a piezoelectric crystal, is secured at a discrete location to an inner concealed surface of a body panel of the vehicle and electrically connected to an electronic signal processing module having an output relay. The output relay is electrically connected with the power control relay of the door lock, the sensor being structured to afford entry into a locked vehicle by sharply tapping the outer surface of the body panel at the exact location and limited area where the concealed sensor has been discretely secured. The system and sensor thus provides access to a vehicle that does not require the owner to carry a battery powered transmitter or rely on memorizing a numerical code.

4 Claims, 2 Drawing Sheets

KEYLESS ENTRY SYSTEM AND SENSOR THEREFOR

This is a continuation-in-part of application Ser. No. 08/666,818, filed Jun. 19, 1996.

BACKGROUND OF THE INVENTION

1. Scope of Invention

This invention is directed to an automotive keyless entry system and more specifically, to an automotive keyless entry system having a unique sensor, preferably including a piezoelectric crystal as a means of actuation.

2. Prior Art

Many keyless entry systems for unlocking automotive vehicles have been disclosed in prior art. U.S. Pat. No. 4,205,325 issued to Haygood et al, describes a system that utilized a computerized keyboard system as a means to enter a digital code. Upon entering the correct digital code, the vehicles electric door lock system would in turn be activated. Additionally, a plurality of other operations could be performed by entering further numerical values. U.S. Pat. No. 4,868,915 issued to Anderson III et al, disclosed a system having a means for defining an interrogation zone, responsive to a coded marker as a means for generating and verifying the correct access code.

Another contribution to the art was disclosed in U.S. Pat. No. 5,134,392 issued to Takeuchi et al, whereas a keyless entry system employed a remote radio code transmitter as a means to activate the vehicles electric lock system.

In U.S. Pat. No. 4,383,242, Sassover teaches an automobile anti-theft system which relies on a hand-held coded transmitter. A tap actuated lock and method of actuating the lock is disclosed by Salem in U.S. Pat. No. 4,197,524. This invention is somewhat closer to the present invention but is distinguished in that a plurality of taps in coded sequence are required to actuate this system and the sensor is of a conventional nature such as an unmodified piezoelectric crystal, a microphone and the like.

Although the above contributions presented significant technological advances in the art, widespread public acceptance has been limited due to the cost of the systems. Also, installing these systems as an aftermarket add-on to the vehicle, presented a task that not only was excessively labor intensive, but if professionally installed has proven too costly for the majority of the motoring public.

BRIEF SUMMARY OF THE INVENTION

This invention is directed to a keyless entry system and sensor for unlocking the door locks of a vehicle. The sensor, preferably in the form of a piezoelectric crystal, is secured at a discrete location to an inner concealed surface of a body panel of the vehicle and electrically connected to an electronic signal processing module having an output relay. The output relay is electrically connected with the power control relay of the door lock, the sensor being structured to afford entry into a locked vehicle by sharply tapping the outer surface of the body panel at the exact location and limited area where the sensor has been discretely secured and concealed from view.

It is therefore an object of this invention to provide a keyless entry system that is inexpensive to construct and easy to install as a means for gaining entry into a locked motor vehicle.

It is also an object of the present invention to provide a means for affording entry into a locked vehicle by adding a simple device to the existing electric lock system of the vehicle.

A further object of the invention is to provide a vehicle keyless entry system that is quickly and easily operated only by the owner or user knowledgeable about the system.

It is yet another object of this invention to provide a uniquely configured sensor for producing an electrical signal in response to a tap of the fingernail and the like which must be placed in a very small, discrete area of a body panel known only to the owner of a vehicle to unlock a vehicle door having electrically powered door locks.

In accordance with these and other objects which will become apparent hereinafter, the instant invention will now be described with reference to the accompanying drawings. The foregoing objects can be accomplished by providing a keyless entry system comprising the following:

1. A sensor cooperating with a vibration transmissive outer panel of a motor vehicle, such sensor being capable of responding to a discrete tapping action of the operator;
2. A means of conveying the sensor output to an electronic circuit module of the invention for the purpose of processing sensor output;
3. The circuit module being capable of processing sensor output to provide a means for actuating the motor vehicle electric door lock system.

In the preferred embodiment of the invention, a uniquely structured sensor including a piezoelectric crystal is secured to an inner surface of a motor vehicle outer body panel at a specific location known only to the owner. It should be further understood that the sensor is secured to the body panel in such a manner as to provide a relatively permanent attachment of the sensor so as to avoid being jarred loose during normal vehicle operation, storage or maintenance.

According to the invention, although not limited to, the sensor, in one embodiment is secured to the concealed inner surface of the vehicle body panel by use of a cyanoacrylate adhesive, although double sided adhesive foam as described below is preferred. An electrical conductor that has been previously attached to the output of the sensor is routed to an electronic processing module mounted on the vehicle. The electronic processing module includes an operational amplifier configured as a voltage follower circuit which receives an electrical signal from the sensor upon the sensor being mechanically stimulated by a discrete tapping action by the operator. Such stimulation can be achieved by sharply tapping as by fingernail the outer surface of the body panel at the exact location and very limited area where the transducer has been secured to the inner surface of the panel.

Upon the voltage follower of the circuit receiving the electrical sensor output signal, the circuit produces a more reliable signal that is directed to the triggering input of a monostable multivibrator. Upon the multivibrator being triggered by the sensor signal, the normally lower output voltage level increases to a higher voltage level for a specific limited duration of time, and is directed to activating a cooperating electromechanical relay. The higher voltage output of the relay, having been connected in parallel with the higher voltage output of the existing vehicle door lock control relay, causes a higher voltage to actuate the door lock mechanism actuators.

Although the embodiment of the invention described above has been applied to a motor vehicle electric door lock system, a plurality of other applications such as unlocking the rear deck lid or energizing an electric window motor may be realized by directing the invention to other such existing systems within the vehicle.

DETAILED DESCRIPTION OF THE INVENTION

Figure 1:
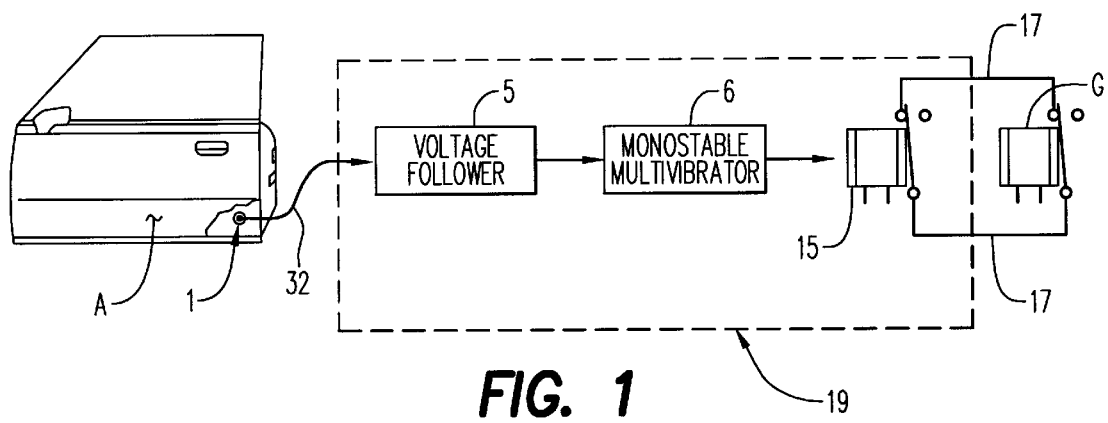
FIG. 1 is a schematic block diagram illustrating the preferred embodiment of the invention.
Figure 3:
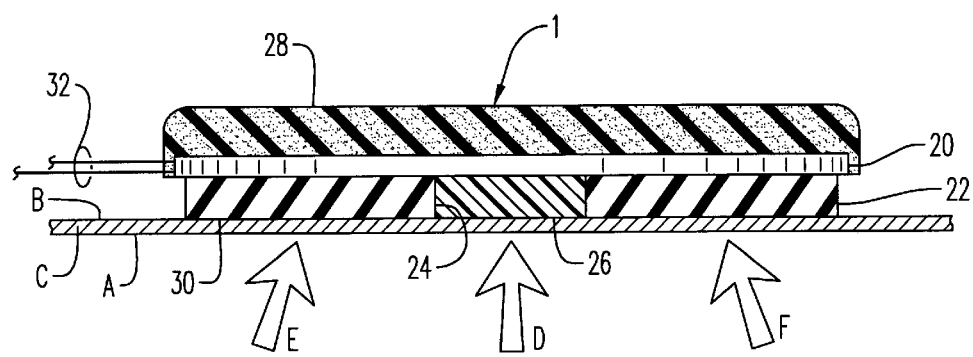
FIG. 3 is a cross section view of the preferred embodiment of the sensor or transducer of the system shown in FIG. 1.

Referring now to the drawings, a flat disc type sensor, preferably a piezoelectric crystal 1 shown in FIG. 3 is secured to the inner surface B of a vehicle outer body panel C with an adhesive. This sensor has a diameter of about 0.7" and a thickness of about 0.08". Conductors 32 that have been attached to the sensor or transducer 1 are routed to an electronic modular circuit 19 providing ground and signal continuity between the sensor 1 and the electronic circuit 19. As the sensor 1 output signal acts upon circuit 19 and integrated circuits (IC) 5 and 6 described below, a cooperating electromechanical relay 15 is energized. During the preselected time period, the relay 15 is energized, the existing vehicle lock relay G output, having been connected in parallel with relay 15, is at a higher voltage level to actuate the vehicle electric door lock actuators (not shown).

Figure 2:
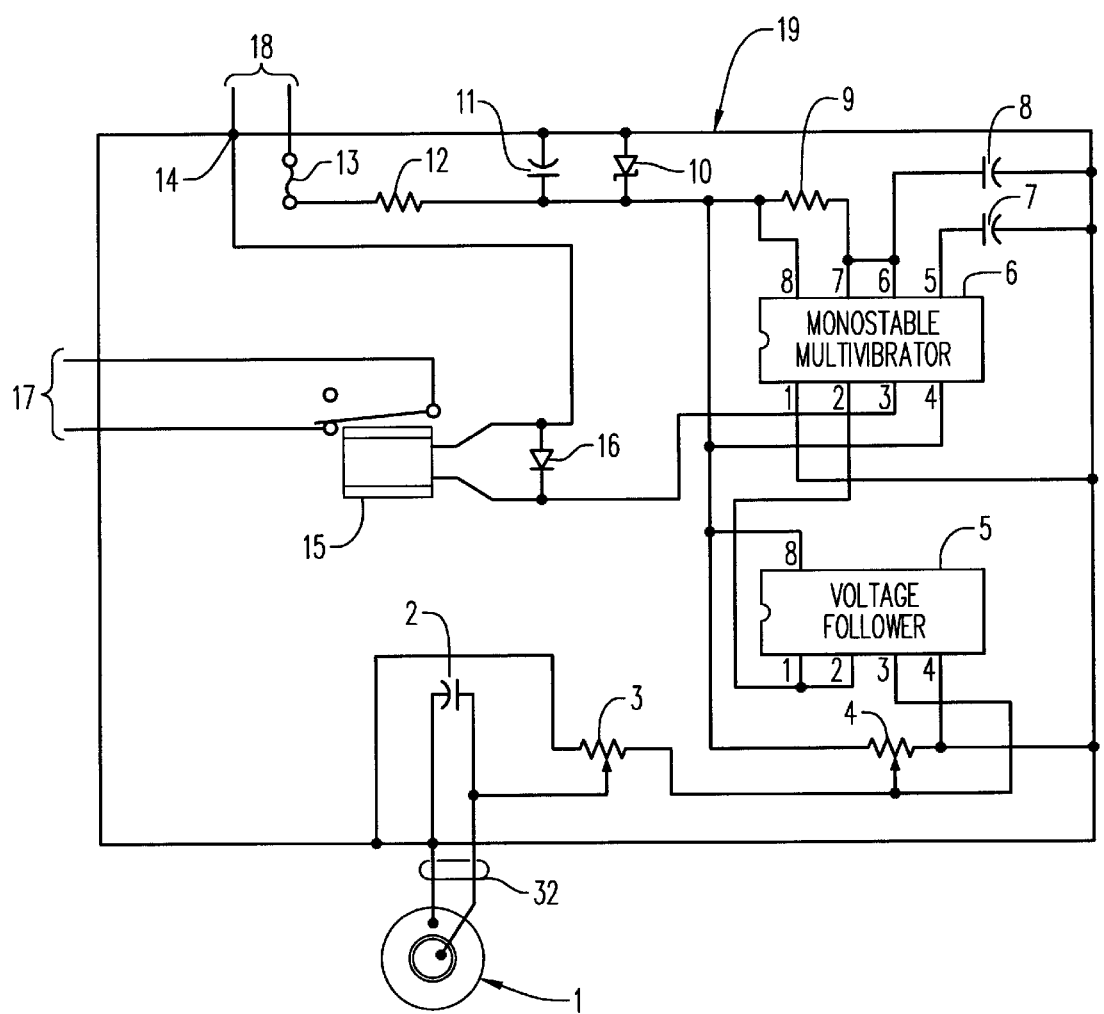
FIG. 2 is a circuit diagram of the preferred embodiment of FIG. 1.

The electronic circuit 19, as best seen in FIG. 2, is powered or energized at all times by a vehicle 12V battery and receives electric power from conductors 18 which are connected to the circuit ground 14 and power supply fuse 13. A current limiting resistor 12 is a 100 ohm, ½ watt resistor connected with a 1000 uf, 16 volt capacitor 11 to form a voltage spike filter to help ensure that unwanted electrical transients do not interfere with circuit 19 operation.

A 13 volt, 5 watt zener diode 10 is provided to further suppress unwanted electrical noise and limit the voltage from the supply conductors 18 in the event the vehicle electrical system (not shown) should malfunction. Additionally, the zener diode 10 protects the circuit 19 from damage should the conductors 18 be accidentally reversed during installation. It should be noted that the supply voltage at the conductors 18 is typically 12.6 volts DC with a fully charged vehicle battery, but is dropped to 10.6 volts DC due to the filter resistor 12, and therefore 10.6 volts DC should be considered the circuits operating voltage with the vehicles engine not running.

The electronic circuit 19 is based around i.c. 6, a timer integrated circuit commercially designated NE 555 P that is configured as a monostable multivibrator. Upon excitation of the sensor 1 by sharply tapping outer body panel C at the exact location where the sensor 1 is secured opposite, an electrical signal is generated and routed to the electronic circuit 19. The signal is reshaped by an RC network comprised of a 0.01 capacitor 2 and a 50K ohm potentiometer 3. The potentiometer 3 serves as a sensitivity adjustment allowing the circuit 19 to respond correctly should the sensor 1, being a vibration sensitive element, be secured to a body part that is less vibration transmissive.

A voltage divider comprised of a 10K ohm potentiometer 4, having its wiper contact terminal voltage set to 4.0 volts DC provides a DC offset voltage that is acted upon by the signal coming from the sensitivity potentiometer 3, producing a composite signal that is directed to pin 3 of IC 5. The IC 5, commercially designated TL 082 CP, is an operational amplifier configured as a voltage follower and is employed in the circuit 19 as a means to help match the sensors 1 output impedance with IC 6 triggering input. Upon the composite signal arriving at pin 3 of IC 5, an output signal of the same shape is produced at pin 2 of IC 5 and is directed to the triggering input at pin 2 of the timer IC 6.

In having a positive supply voltage of 10.6 volts DC, IC 6 requires that the triggering voltage to initiate a timing cycle be brought to approximately 33% of the supply voltage to IC 6, or in this case 3.5 volts DC.

Having provided the triggering input of IC 6 with 4.0 volts DC, due to the voltage divider 4, the composite signal from pin 2 of IC 5 is sufficient in amplitude and duration to modulate the 4.0 volt DC offset voltage to 3.5 volts DC and permit IC 6 to begin its timing cycle.

For the duration of the timing cycle, the output of IC 6 at pin 3 is at a higher voltage level and is directed to an electromechanical relay 15 having its higher voltage contacts output 17 connected in parallel with the door unlock relays contacts G, and thus activating the vehicle electric door lock mechanism actuators (not shown).

The IC 6 requires that approximately 66% of its supply voltage level be applied to the threshold input at pin 6 in order to terminate the timing cycle and bring its output at pin 3 low again. This is accomplished by providing an RC network comprised of 1K ohm resistor 9 and a 100 uf capacitor 8. Having remained in a discharged state during standby status, capacitor 8 begins to charge through the 1K ohm resistor 9. When the charge in the capacitor 8 reaches approximately 66% of the IC 6 supply voltage, in this case 7.0 volts DC, the IC 6 resets and its output at pin 3 is brought to a lower voltage level status, removing drive voltage from relay 15 and placing the circuit 19 in standby mode again.

It should be noted that the values of the timing resistor 9 and the timing capacitor 8 have been selected to provide a timing cycle duration of approximately 0.10 second to help ensure that a complete door lock mechanism function occurs. A clamping diode 16 protects IC 6 output from inductive voltage kickback when the drive voltage to relay 15 is removed at the end of the timing cycle. Also, a 0.1 uf capacitor 7 has been connected to the control voltage terminal of IC 6 to help ensure timer triggering voltage level stability.

During vehicle operation, normal vehicle supply voltages can increase to approximately 14.2 to 14.6 volts DC, or decrease to approximately 9.8 to 10.2 volts DC. The invention operation remains stable due to the fact that IC 6 relies on voltage ratios. The timing duration and triggering voltages are not dependent on the precise voltage directed to the inputs, but rather the input voltage ratio in respect to the supply voltage to IC 6. This stability is further enhanced due to the filter resistor 12 and capacitor 11 time constant providing for a more gradual supply voltage transition during normal vehicle operation.

Referring now particularly to FIG. 3, the preferred embodiment of sensor 1 is there shown. This sensor 1 includes a piezoelectric crystal 20 having a thin disc shape which is protectively covered on its exposed surface by an encapsulating layer of silicone rubber 28. On the opposite surface of the piezoelectric crystal 20, a doughnut-shaped vibration isolator 22 is adhered thereto. The material used in this vibration isolator 22 is selected to minimize transmission of vibration energy delivered to the outer surface A of body panel C in the direction of arrows E or F of FIG. 3. The preferred material for the vibration isolator 22 is double-sided foam adhesive tape.

A small disc-shaped member 26 is bonded centrally to the surface of the piezoelectric crystal 20 within a central aperture 24 of the vibration isolator 22. This disc-shaped member 26 is formed of a rigid or semi-rigid plastic which has high vibration transmitting properties. The preferred material for this disc-shaped member 26 is thermoplastic but not by way of limitation thereof. Any rigid or semi-rigid material such as metal or ceramic could be used.

By this sensor 1 arrangement, a maximum sensitivity to tapping in the direction of arrow D directly over or opposite the concealed disc-shaped member 26 is achieved. By providing a very small and controlled area of activation of the piezoelectric crystal 20 due to tapping energy applied in the direction of arrow D, the possibility of inadvertent activation of this system 19 is greatly reduced, while the selectivity is greatly enhanced due to the very small dimension and type of material used in this disc-shaped member 26. Thus, blunt forces such as even direct impact of a baseball or basketball or grocery cart, even virtually directly against the area of the outer surface A of body panel C will be ignored by the system. This is attained by the novel mounting of the disc-shaped member 26 within the central aperture of the vibration isolator 22. Any non-precise application of force to the outer surface A simply causes the force to act upon the entire area as a whole, resulting in surface A and the sensor 1 moving in unison and thereby substantially reducing the flexure of the piezoelectric crystal to the extent that the sensor 1 is virtually non-responsive to any force except a precisely-placed sharp tap by one who is knowledgeable of its presence and exact secret location.

The advantage of this sensor configuration in FIG. 3 is that it maximizes the sensitivity and selectivity of the system wherein the selectivity is a function of the size of the disc-shaped area and type of material through which sufficient physical stimulation can be effectively transmitted tot he piezoelectric sensor 20. Sensitivity is a function of the amount of electrical energy needed to initiate a timing cycle (momentarily drop the 4.0 vdc offset voltage down to 3.5 vdc). By providing an area of excitation that is smaller than that of the total surface area of the entire sensor 20, sensitivity is retained. However, the selectivity is greatly enhanced due to the small dimension and type of material used as the disc 26 medium.

The effect is the same as thrusting an unsharpened pencil down onto the center of a pop-top can which, in turn, will result in flexure of the can's lid. However, if the pencil were the same diameter as the can, the can would collapse and almost no lid flexure would occur. Or, if the pencil was constructed from too soft of a material such as foam rubber, flexure could not occur because the pencil would absorb the mechanical force that we would be exerting on it. Therefore, blunt forces such as a basketball impacting the area of the vehicle where the sensor is mounted tend to be ignored by the system. This is due to the broad area of the vehicle surface that absorbs the impact not being able to transmit sufficient mechanical force through the insulator to cause sufficient sensor flexure that would result in a system response. The impact force absorbed by this relatively broad area would have to be collectively focused onto the exact area of the surface where the disc 26 contacts the surface opposite. Essentially, the selected surface and the sensor would move as one and sufficient flexure to trigger a system response would not be possible.

Also, it should be understood that, although the above description of the preferred embodiment describes the invention as being applied to a motor vehicle electric door lock system, other applications could be realized as well. By changing the time constant of the timing resistor 9 and capacitor 8 to provide for a different timing cycle duration, the invention could be applied to a vehicle electric window motor, sunroof, or rear deck lid.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A keyless entry system for actuating a door lock of a vehicle comprising:

a piezoelectric crystal attachable against a selected concealed surface of an outer panel of the vehicle for detecting a tap against only a discrete area of a limited size and for generating an electric output signal in response to each said tap;

actuating means electrically interconnectable between said sensor means and a control means of the door lock responsive to said electrical output signal for electrically activating the door lock for a preselected short time period sufficient to move the door lock from a locked into an unlocked position;

a substantially doughnut shaped vibration insulator and a rigid or semi-rigid flat disc positioned within a central aperture of said vibration isolator and against said piezoelectric crystal, said disc defining said discrete area.

2. A sensor for a keyless entry system which actuates a door lock of a vehicle when attached to a selected concealed surface of an outer panel of the vehicle, said sensor detecting a tap against only a discrete area of limited size which generates an electrical output signal in response to each said tap, said output signal controlling an actuating means which is electrically interconnected between said sensor and a control means of the door lock responsive to said output signal for electrically activating the door lock for a preselected short time period sufficient to move the door lock from a locked into an unlocked position, said sensor comprising:

a substantially flat piezoelectric crystal mounted against a substantially doughnut shaped, flat vibration insulator having a rigid or semi-rigid flat disc positioned within a central aperture of said vibration isolator and against said sensor, said disc defining said discrete area.

3. In an electrically actuated door lock of a vehicle including a lock control means for electrically activating the door lock to move the door lock between a locked into an unlocked position, the improvement comprising:

a sensor attached to a selected concealed surface of an outer panel of the vehicle for detecting a tap against only a discrete area of limited size and for generating an electric output signal in response to each said tap;

actuating means electrically interconnected between sensor means and the lock control means responsive to said electric output signal for opening the door lock;

said sensor including a piezoelectric crystal mounted against a substantially doughnut shaped, flat vibration insulator having a rigid or semi-rigid flat disc positioned within a central aperture of said vibration isolator and against said sensor, said disc defining said discrete area and being capable of transmitting vibration from each tap to said sensor.

4. A keyless entry system for actuating a door lock of a vehicle comprising:

a sensor attachable to a selected concealed inner surface of an outer panel of the vehicle, said sensor capable of generating an electric output signal in response to a tap against only a discrete area of the outer panel of limited size;

said sensor positioned against a vibration isolating layer having an exposed adhesive surface for attachment of said sensor to the outer panel;

a rigid or semi-rigid disc defining said discrete area and smaller in surface area than that of said sensor, said disc positioned within a central aperture of said vibration isolating layer whereby inadvertent and unauthorized activation of said system is substantially reduced;

an actuator electrically interconnectable between said sensor and a control circuit of the door lock responsive to said electrical output signal for electrically activating the door lock for a preselected short time period sufficient to move the door lock from a locked into an unlocked position.

* * * * *